US008490165B2

(12) United States Patent
Wray

(10) Patent No.: US 8,490,165 B2
(45) Date of Patent: *Jul. 16, 2013

(54) RESTORING SECURE SESSIONS

(75) Inventor: John Clay Richard Wray, Chelmsford, MA (US)

(73) Assignee: International Business Machines Corporation, Armonk, NY (US)

( * ) Notice: Subject to any disclaimer, the term of this patent is extended or adjusted under 35 U.S.C. 154(b) by 424 days.

This patent is subject to a terminal disclaimer.

(21) Appl. No.: 12/821,355

(22) Filed: Jun. 23, 2010

(65) Prior Publication Data

US 2011/0320820 A1  Dec. 29, 2011

(51) Int. Cl.
*G06F 7/04* (2006.01)

(52) U.S. Cl.
USPC .............. 726/6; 726/2; 726/3; 726/4; 726/5

(58) Field of Classification Search
None
See application file for complete search history.

(56) References Cited

U.S. PATENT DOCUMENTS

| | | | |
|---|---|---|---|
| 5,875,296 A * | 2/1999 | Shi et al. ........................... | 726/5 |
| 6,041,357 A | 3/2000 | Kunzelman et al. | |
| 6,311,269 B2 * | 10/2001 | Luckenbaugh et al. ....... | 713/154 |
| 6,606,708 B1 | 8/2003 | Devine et al. | |
| 7,114,083 B2 | 9/2006 | Devine et al. | |
| 7,251,827 B1 * | 7/2007 | Guo et al. ........................ | 726/8 |
| 7,552,218 B2 | 6/2009 | Kaluskar et al. | |
| 7,779,103 B1 * | 8/2010 | Fikes et al. ..................... | 709/223 |
| 2004/0059941 A1 * | 3/2004 | Hardman et al. .............. | 713/201 |
| 2004/0088260 A1 * | 5/2004 | Foster et al. ..................... | 705/64 |
| 2008/0052775 A1 | 2/2008 | Sandhu et al. | |

FOREIGN PATENT DOCUMENTS

| | | |
|---|---|---|
| JP | 2004280828 A | 10/2004 |
| JP | 2009100195 A | 5/2009 |
| WO | 9916099 A2 | 4/1999 |
| WO | 2007102823 A1 | 9/2007 |

OTHER PUBLICATIONS

Jong et al., "A New Design for a Practical Secure Cookies System", INSPEC/Journal of Information Science and Engineering, vol. 22, No. 3, May 2006, pp. 559-571.
Gaston et al, "CGI program generation and session-based authentication", Dialog/INSPEC, Mar. 2005, pp. 391-396.
Cardellini et al., The State of the Art in Locally Distributed Web-Server Systems:, ACM Digital Library, vol. 34, No. 2, Jun. 2002, pp. 263-311.
USPTO Notice of Allowance, U.S. Appl. No. 12/821,304, Aug. 9, 2012, 13 pages.
USPTO Office Action, U.S. Appl. No. 12/821,304, Mar. 16, 2012, 12 pages.

* cited by examiner

*Primary Examiner* — Peter Poltorak
(74) *Attorney, Agent, or Firm* — Yee & Associates, P.C.; Jeffrey S. LaBaw

(57) ABSTRACT

The different illustrative embodiments provide a method, a computer program product, and an apparatus for restoring secure sessions. A determination is made whether cached information for a session for the requestor is stored at the data processing system using a session cookie responsive to receiving a request at a data processing system from a requestor to access a resource. Access to the resource is controlled using the cached information and a number of privileges for the requestor associated with the cached information responsive to a determination that the cached information for the session is stored at the data processing system. A migration cookie is requested from the requestor responsive to an absence of a determination that the cached information for the session is stored at the data processing system. The cached information is generated for the session using the migration cookie.

20 Claims, 8 Drawing Sheets

RESTORING SECURE SESSIONS

CROSS-REFERENCE TO RELATED APPLICATION

This application is related to the following patent application: entitled "Managing Secure Sessions", Ser. No. 12/821,304, and filed on Jun. 23, 2010 assigned to the same assignee, and incorporated herein by reference.

BACKGROUND

1. Field

The disclosure relates generally to an improved data processing system and more specifically to restoring secure sessions.

2. Description of the Related Art

Servers are frequently used to control access to resources by one or more clients. The resources may be stored on the server or on a network to which the server is connected. A user wishing to access a resource to which access is controlled by the server typically connects to the server to request the access. Access is controlled based on the identity of the user or the client. In other words, access to the resource may be granted to one user connecting to the server on a particular client, while access to the resource may be denied to another user connecting the server on the same client or another client.

The server requests identification information from the client in order to determine whether the user is to be granted or denied the requested type of access to the requested resources. A resource, for example, is a file, a folder, a drive, an application, a database, or any other suitable information or organization of information. In some examples, the client requests the identification information from the user. The client may request the identification information by prompting the user to enter a user name and/or password, a biometric input, an access card, or another suitable identifier.

A client frequently accesses more than one resource on the server over a period of time. Sessions are created to avoid requesting the identification information from the client for each resource that is accessed. Sessions are commonly created when a server first transmits the requested identification information by sending session information to the client for the purpose of creating a cookie on the client. The cookie contains an identifier for the session. When creating the session, the server also stores the session identifier in a database of sessions. Upon transmitting subsequent requests for resources on the server, the client transmits the identifier for the session from the cookie to the server with the request. The client only transmits the identifier for the session from the cookie when the domain of the server receiving the request is the same as the domain of the server that set the cookie. For example, if a cookie is created with an identifier for a session on a server in the "yahoo.com" domain, the client will transmit the identifier from the cookie to future requests to "yahoo.com", but not to requests to "google.com." The server uses the identifier to make decisions about which resources may be returned or whether a session has existed for more than a particular period of time and has expired.

Servers are commonly taken offline to perform maintenance, to be moved, or due to hardware or software failures. Session data may be lost when the server is taken offline. Another server may provide access to the requested resources. For example, the servers may be configured in a cluster. If another server provides access to the requested resources, the client is requested by the second server to send identifying information to create a new session on the second server and have continued access to the resources. The identification information of the user may be requested again.

Accordingly, it would be advantageous to have a method, a computer program product, and an apparatus which takes into account one or more of the issues discussed above as well as possibly other issues.

SUMMARY

The different illustrative embodiments provide a method, a computer program product, and an apparatus for restoring secure sessions. A determination is made whether cached information for a session for the requestor is stored at the data processing system using a session cookie responsive to receiving a request at a data processing system from a requestor to access a resource. Access to the resource is controlled using the cached information and a number of privileges for the requestor associated with the cached information responsive to a determination that the cached information for the session is stored at the data processing system. A migration cookie is requested from the requestor responsive to an absence of a determination that the cached information for the session is stored at the data processing system. The cached information is generated for the session using the migration cookie.

DETAILED DESCRIPTION

Figures 1, 4:
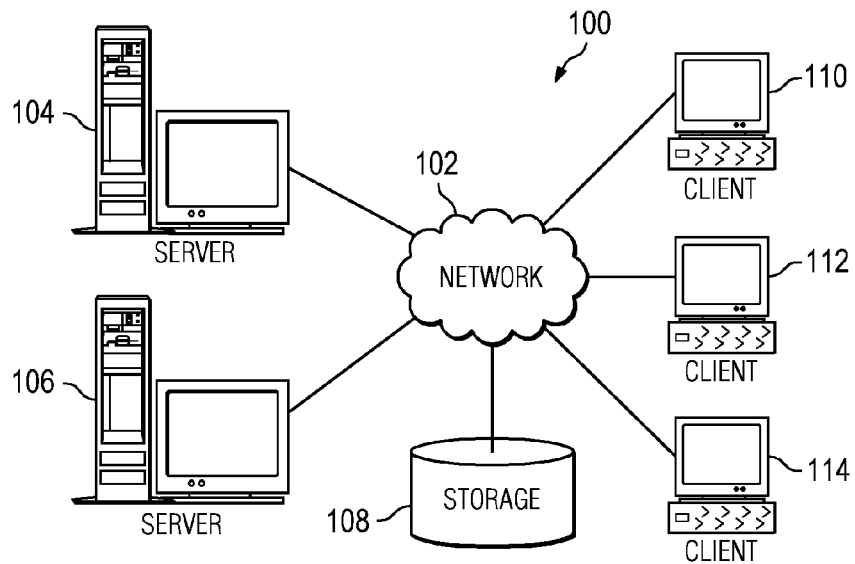
FIG. 1 depicts a pictorial representation of a network of data processing systems in which illustrative embodiments may be implemented.
FIG. 4 is an illustration of a cookie depicted in accordance with an illustrative embodiment.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit", "module", or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disk read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including, but not limited to, wireless, wireline, optical fiber cable, RF, etc., or any suitable combination of the foregoing. Computer program code for carrying out operations for aspects of the present invention may be written in any combination of one or more programming languages, including an object-oriented programming language, such as Java, Smalltalk, C++, or the like and conventional procedural programming languages, such as the "C" programming language or similar programming languages.

The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Aspects of the present invention are described below with reference to flowcharts and/or block diagrams of methods, apparatus (systems), and computer program products according to embodiments of the invention.

It will be understood that each block of the flowcharts and/or block diagrams and combinations of blocks in the flowcharts and/or block diagrams can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture, including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus, or other devices to produce a computer implemented process such that the instructions which operate on the computer or other programmable apparatus provide processes for implementing the functions/acts specified in the flowchart and/or block diagram block or blocks.

With reference now to the figures and in particular with reference to FIG. 1, an illustrative diagram of a data processing environment is provided in which illustrative embodiments may be implemented. It should be appreciated that FIG. 1 is only provided as an illustration of one implementation and is not intended to imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client computers 110, 112, and 114 connect to network 102. Client computers 110, 112, and 114 may be, for example, personal computers or network computers. In the depicted example, server computer 104 provides information, such as boot files, operating system images, and applications to client computers 110, 112, and 114. Client computers 110, 112, and 114 are clients to server computer 104 in this example. Network data processing system 100 may include additional server computers, client computers, and other devices not shown.

Program code located in network data processing system 100 may be stored on a computer recordable storage medium and downloaded to a data processing system or other device for use. For example, program code may be stored on a computer recordable storage medium on server computer 104 and downloaded to client computer 110 over network 102 for use on client computer 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as, for example, an intranet, a local area network (LAN), or a wide area network (WAN). FIG. 1 is intended as an example, and not as an architectural limitation for the different illustrative embodiments.

Computers in network data processing system 100, such as client computer 110 and server computer 104, implement illustrative embodiments to manage sessions in which access to resources occurs. In these examples, a client computer, such as client computer 110, connects to a server computer, such as server computer 104. Client computer 110 then requests access to a resource from server computer 104. The client is requested by server computer to transmit identification information. Client computer 110 may prompt a user for identification information to access the resources. Client computer 110 transmits the identification information over network 102. Server computer 104 may transmit session information and the requested resource to client computer 110 over network 102.

Figure 2:
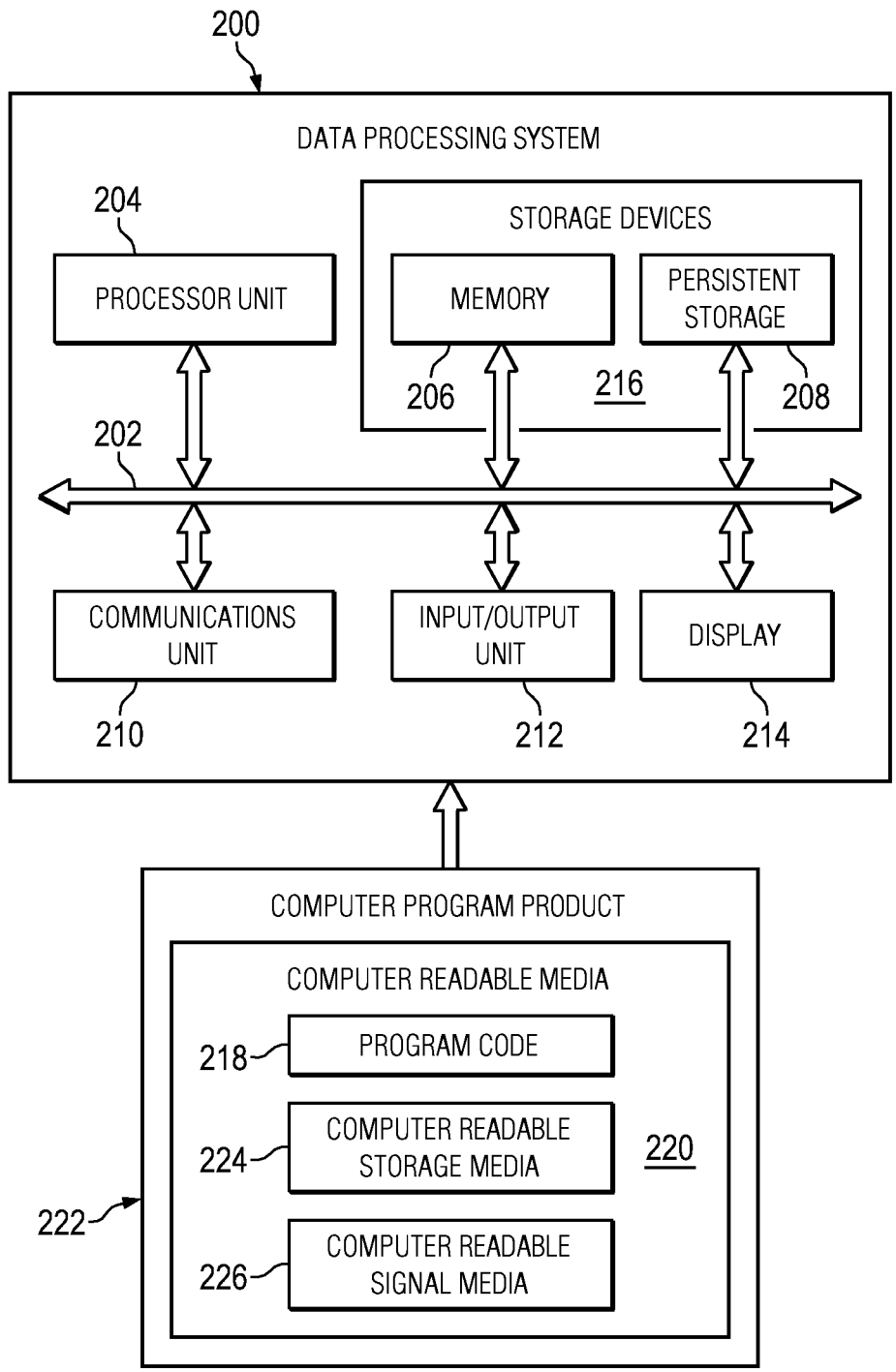
FIG. 2 is a diagram of a data processing system depicted in accordance with an illustrative embodiment.

Turning now to FIG. 2, a diagram of a data processing system is depicted in accordance with an illustrative embodiment. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a number of processors, may be a multi-processor core, or some other type of processor, depending on the particular implementation. A "number", as used herein, with reference to an item, means "one or more items". Further, processor unit 204 may be implemented using a number of heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples, the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code in the different embodiments may be embodied on different physical or computer readable storage media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be computer readable storage media 224 or computer readable signal media 226. Computer readable storage media 224 may include, for example, an optical or magnetic disc that is inserted or placed into a drive or other device that is part of persistent storage 208 for transfer onto a storage device, such as a hard drive that is part of persistent storage 208. Computer readable storage media 224 also may take the form of a persistent storage, such as a hard drive, a thumb drive, or a flash memory that is connected to data processing system 200. In some instances, computer readable storage media 224 may not be removable from data processing system 200. In these illustrative examples, computer readable storage media 224 is a non-transitory computer readable storage media.

Alternatively, program code 218 may be transferred to data processing system 200 using computer readable signal media 226. Computer readable signal media 226 may be, for example, a propagated data signal containing program code 218. For example, computer readable signal media 226 may be an electro-magnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 218 may be downloaded over a network to persistent storage 208 from another device or data processing system through computer readable signal media 226 for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of executing program code. As one example, the data processing system may include organic components integrated with inorganic components, and/or may be comprised entirely of organic components, excluding a human being. For example, a storage device may be comprised of an organic semiconductor.

As another example, a storage device in data processing system 200 is any hardware apparatus that may store data. Memory 206, persistent storage 208 and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache, such as found in an interface and memory controller hub that may be present in communications fabric 202.

The different illustrative embodiments recognize and take into account a number of different considerations. For example, the different illustrative embodiments recognize and take into account that storing information about a session of a client on a server that controls access to a number of resources can be disadvantageous. For example, storing information about a session of a client on a server can be disadvantageous when the server experiences downtime, the server is moved, or load balancing methods cause the client to switch from communicating with the first server to communicating with another server.

The different illustrative embodiments also recognize and take into account that a number of cookies are stored within a client and/or a client browser. The different illustrative embodiments also recognize and take into account that these cookies can be used to store session data. The session data includes the identity of the client or user. The different illustrative embodiments recognize and take into account that one cookie may contain a session identifier and timestamp information. The second cookie may contain the session identifier and an authenticated user identity. The authenticated user identity is provided to the client by the server in the second cookie when the server authenticates the user.

Providing the number of cookies to the server when requesting a resource allows the server to recreate a session for the client when a session does not exist. The session may not exist on the server because the server was rebooted, the server experienced downtime, and/or the client was switched to communicate with another server in a cluster. The server may cause the client to send the number of cookies containing the session information by redirecting the user from the requested resource to a resource configured to receive the number of cookies. In these examples, the server uses an HTTP 301 redirect response to redirect the client browser to an authentication script. The authentication script requests and receives the number of cookies. The number of cookies may have been encrypted and/or signed when the cookies were originally sent to the client. Encryption and/or signature of the cookies allows the server to trust the authenticated identity sent by the client.

The different illustrative embodiments recognize and take into account that the server may determine whether the session is still valid based on the session information sent by the client in the number of cookies. For example, the server may verify that the session described by the number of cookies sent by the client has not extended beyond a time limit and/or idle time limit set by a policy or rule. The policy or rule may be stored in the number of cookies and sent by the client as part of the number of cookies.

Thus, the different illustrative embodiments provide a method, a computer program product, and an apparatus for restoring secure sessions. A determination is made whether cached information for a session for the requestor is stored at the data processing system using a session cookie responsive to receiving a request at a data processing system from a requestor to access a resource. Access to the resource is controlled using the cached information and a number of privileges for the requestor associated with the cached information responsive to a determination that the cached information for the session is stored at the data processing system. A migration cookie is requested from the requestor responsive to an absence of a determination that the cached information for the session is stored at the data processing system. The cached information is generated for the session using the migration cookie.

Figure 3:
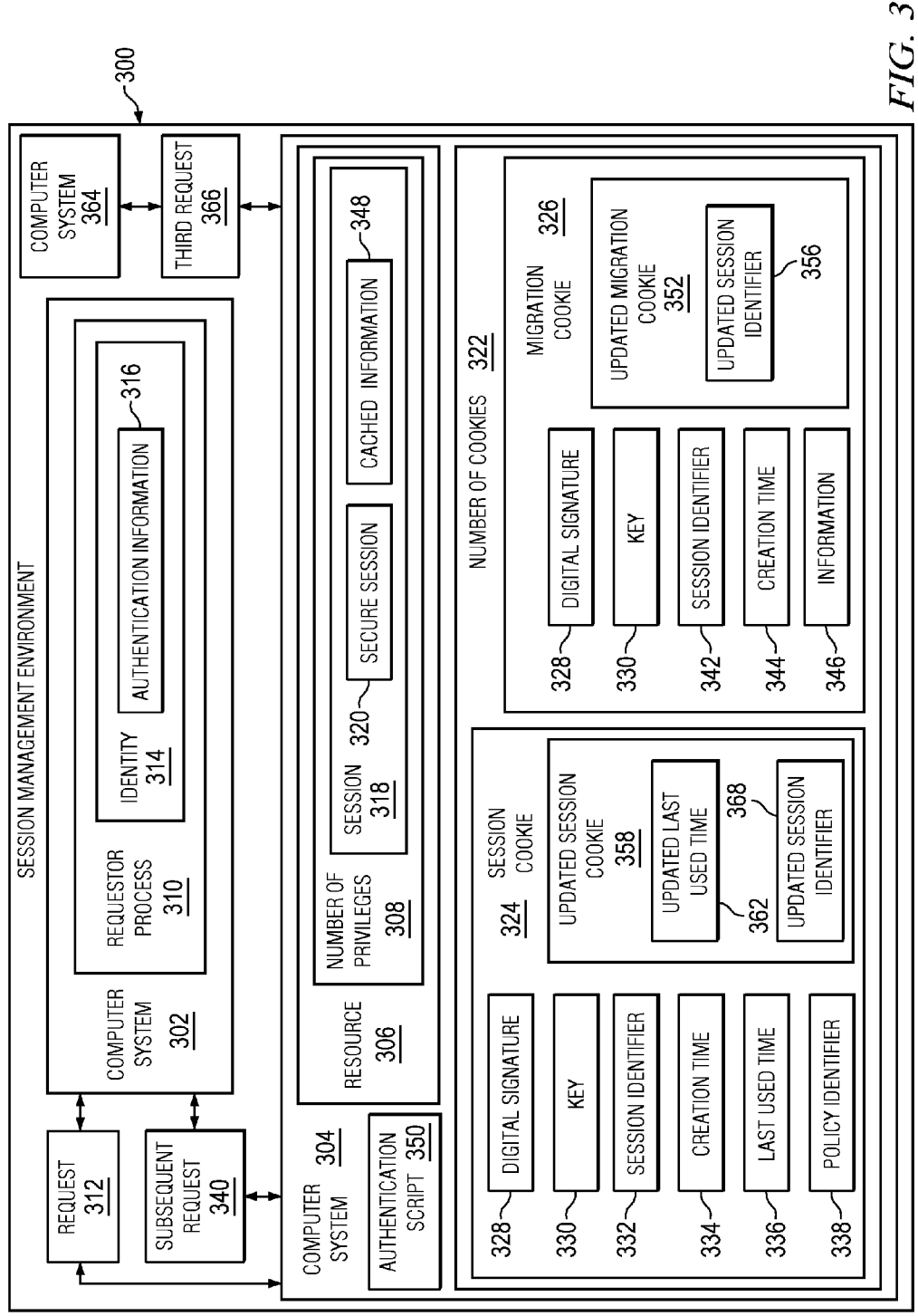
FIG. 3 is an illustration of a session management environment depicted in accordance with an illustrative embodiment.

Turning now to FIG. 3, an illustration of a session management environment is depicted in accordance with an illustrative embodiment. Session management environment 300 may be implemented in network data processing system 100 using client computer 110 and server computer 104 in FIG. 1. Of course, session management environment 300 may include additional client computers, server computers, and/or other suitable components.

Session management environment 300 contains computer system 302 and computer system 304. In these examples, computer system 302 is an example implementation of client computer 110, and computer system 304 is an example implementation of server computer 104. Of course, computer system 302 and computer system 304 may be combined into one computer system in some illustrative embodiments.

Computer system 304 controls access to resource 306. Resource 306 is a file, a folder, a drive, an application, a database, or another suitable resource to which access is controlled by computer system 304. Access to resource 306 is divided into number of privileges 308. Number of privileges 308 defines the users and clients that can access resource 306, and what type of access is permitted for the users and clients. For example, some users may be permitted to read and write to resource 306, while other users may only read resource 306.

Computer system 302 runs requestor process 310. Requestor process 310 requests resource 306 from computer system 304 by sending request 312 to computer system 304. Request 312 contains information used to identify the requested resource 306. For example, request 312 may contain a URL or a file path of the requested resource 306.

Request 312 also contains identity 314. Identity 314 is an identity of a user and/or computer system 302. In illustrative embodiments in which identity 314 is an identity of the user, request 312 also contains authentication information 316. Authentication information 316 is information that authenticates the user described by identity 314. Authentication information 316 may be any combination of a user name, a password, an access card, a biometric identifier, a certificate, or any other suitable authentication information.

When computer system 304 receives request 312, computer system 304 retrieves authentication information 316 from request 312. In addition to containing authentication information 316, request 312 also contains an identification of the resource on computer system 304 requested by computer system 302. In these examples, the requested resource in request 312 is resource 306. Once computer system 304 retrieves authentication information 316, computer system 304 identifies number of privileges 308 for the user that correspond to authentication information 316. Number of privileges 308 may be identified based on information stored in a user database accessible to computer system 304.

Once computer system 304 identifies number of privileges 308, computer system 304 creates session 318. In these examples, session 318 is secure session 320. Secure session 320 is secure at least because number of privileges 308 were identified based on authentication information 316. Secure session 320 may also be secure because request 312 and/or resource 306 are transmitted over an encrypted connection. In these examples, session 318 is not stored on computer system 304. Instead, computer system 304 creates number of cookies 322. Number of cookies 322 consists of session cookie 324 and migration cookie 326. A cookie is data stored on computer system 302 based on information received from computer system 304. A cookie consists of one or more name-value pairs of data. In this illustrative embodiment, session cookie 324 contains session identifier 332, creation time 334, last used time 336, and policy identifier 338.

Session identifier 332 is information that identifies session 318 on computer system 304. Session identifier 332 may take the form of a number. In some illustrative examples, session identifier 332 is unique among other sessions generated by computer system 304.

Creation time 334 is the time that session cookie 324 was generated by computer system 304. Last used time 336 is a timestamp representing the most recent time at which computer system 302 requested resource 306. Last used time 336 may be updated by computer system 304 upon receiving subsequent request 340. Subsequent request 340 is a request for resource 306 received later in time than request 312. Policy identifier 338 identifies a number of rules associated with session 318. In these examples, policy identifier 338 includes a rule for a maximum amount of time that session 318 may last, and a rule for how long session 318 may remain idle. Session 318 is idle when computer system 302 is not requesting resource 306 from computer system 304.

Migration cookie 326 consists of session identifier 342, creation time 344, and information 346. Session identifier 342 is the same identifier as session identifier 332. Creation time 344 is the same creation time as creation time 334. Information 346 is an identifier for the user or client requesting resource 306. In these examples, the client requesting resource 306 is computer system 302. Information 346 may consist of a user name or a listing of number of privileges 308 for the user requesting resource 306.

In some illustrative embodiments, migration cookie 326 does not contain creation time 344. Instead, session identifier 342 in migration cookie 326 contains an identifier that represents computer system 304 and an additional identifier. For example, the identifier may be a host name or IP address of computer system 304. The additional identifier may be a random number.

In some illustrative embodiments, session cookie 324 and/or migration cookie 326 are encrypted with key 330. Session cookie 324 and migration cookie 326 may be encrypted using an encryption algorithm, including, without limitation, Data Encryption Standard (DES), Blowfish, International Data Encryption Algorithm (IDEA), Software Optimized Encryption Algorithm (SEAL), RC4, or another suitable encryption algorithm. Session cookie 324 and/or migration cookie 326 may also be signed with digital signature 328. Additionally, and/or encrypted using key 330 that is known to computer system 304. In illustrative embodiments in which computer system 304 is a member of a cluster of computer systems, key 330 is shared with other members of the cluster. Of course, neither session cookie 324 nor migration cookie 326 are signed or encrypted in some illustrative embodiments. For example, when computer system 302, computer system 304, and users of computer system 302 and computer system 304 are trusted not to make unauthorized modifications to session cookie 324 and/or migration cookie 326, session cookie 324 and/or migration cookie 326 may not be signed or encrypted.

In some illustrative embodiments, number of cookies 322 is transmitted from computer system 304 to computer system 302 and stored on computer system 302. In other illustrative embodiments, computer system 304 transmits information contained in number of cookies 322. In such illustrative embodiments, computer system 302 generates number of cookies 322 and stores number of cookies 322. The data transmitted to computer system 302 may still be encrypted using key 330 and/or signed with digital signature 328 by computer system 304.

At a point in time after number of cookies 322 are stored on computer system 302, computer system 302 transmits subsequent request 340 to computer system 304. Subsequent request 340 is an additional request for resource 306. However, in other illustrative embodiments, subsequent request 340 may be a request for other resources on computer system 304. In such illustrative embodiments, access to other resources may also be controlled by using number of privileges 308. When computer system 304 receives subsequent request 340, computer system 304 determines whether cached information 348 is stored on computer system 304. Cached information 348 contains information about session 318. For example, cached information 348 may contain a session identifier for session 318.

If computer system 304 determines that cached information 348 exists on computer system 304, computer system 304 grants or denies access to resource 306 based on number of privileges 308. Subsequent request 340 may also contain session cookie 324. In such illustrative embodiments, the session identifier in cached information 348 is compared with session identifier 332 in session cookie 324.

If the session identifier cached information 348 matches the session identifier 332 in session cookie 324, policy identifier 338 is processed by computer system 304. Computer system 304 uses policy identifier 338 to determine whether session 318 has expired or is no longer valid for the particular user. For example, policy identifier 338 may indicate that session 318 is not to remain active for more than fifteen minutes. In such an illustrative example, computer system 304 compares creation time 334 to the current time. If the current time is more than fifteen minutes after creation time 334, session 318 is expired. Once session 318 is expired, computer system 304 transmits instructions to computer system 302 to delete session cookie 324.

If session 318 is determined to be valid, access to resource 306 is granted or denied based on number of privileges 308. In some illustrative embodiments, computer system 304 updates session cookie 324 and sends session cookie 324 to computer system 302 for storage. In such an illustrative embodiment, computer system 302 may update session cookie 324 with the updated information. For example, computer system 304 may send session cookie 324 with an updated last used time 336 that is set to the time the updated session cookie 358 is generated.

If the session identifier in cached information 348 does not match session identifier 332 or cached information 348 is not stored on computer system 304, computer system 304 requests migration cookie 326 from computer system 302. In these examples, cached information 348 may not be present on computer system 304 because computer system 304 experiences data loss between sending number of cookies 322 to computer system 302 and receiving subsequent request 340 from computer system 302. In other illustrative embodiments, cached information 348 is not present on computer system 304 because computer system 304 was replaced by another computer system. Alternatively, another computer system may receive and respond to subsequent request 340 based on a load balancing scheme and/or a cluster environment in which the computer system that has the fewest pending requests accepts subsequent request 340 and communicates with computer system 302. In these examples, computer system 304 requests migration cookie 326 from computer system 302 by redirecting computer system 302 to authentication script 350. Authentication script 350 is located at an address such that computer system 302 transmits migration cookie 326 to computer system 304 when redirected to the address for authentication script 350. In these examples, the domain parameter of migration cookie 326 is configured with the address of authentication script 350. Authentication script 350 requests that computer system 302 and/or a user of computer system 302 provide authentication information 316.

When computer system 304 receives migration cookie 326, computer system 304 decrypts migration cookie 326 if migration cookie 326 is encrypted. Computer system 304 also verifies a signature on migration cookie 326, if migration cookie 326 was signed by computer system 304 or another certification authority. Once migration cookie 326 is decrypted and a signature is verified, session 318 is recreated by storing cached information 348 from migration cookie 326 on computer system 304.

In some illustrative embodiments, cached information 348 is not recreated if session cookie 324 and/or migration cookie 326 indicate that session 318 has expired. In these examples, policy identifier 338 contains information used to determine whether session 318 has expired. For example, policy identifier 338 may contain a maximum period of time that session 318 may exist or a maximum period of time that session 318 may be idle prior to expiring.

Cached information 348 is stored on computer system 304 to contain session identifier 342, creation time 344, and information 346. In these examples, information 346 identifies computer system 302 and/or the user of computer system 302 as a user name or number of privileges 308 granted to computer system 302 and the user of computer system 302.

After session 318 is recreated on computer system 304, computer system 304 returns the resource requested in subsequent request 340 to computer system 302. In some illustrative embodiments, prior to returning the resource requested in subsequent request 340, computer system 304 generates updated session cookie 358. Components of updated session cookie 358 may be added to session cookie 324 or updated session cookie 358 may replace session cookie 324. Updated session cookie 358 is formatted like session cookie 324. However, updated session cookie 358 contains an updated last used time 362. Updated last used time 362 is a representation of the time at which computer system 304 returned resource 306 to computer system 302.

In some illustrative embodiments, updated session cookie 358 also contains updated session identifier 368. However, in other illustrative embodiments, session identifier 332 is reused in updated session cookie 358. Reusing session identifier 332 allows session identifier 332 to reference cached information 348 stored on computer system 304 or another computer system on which the session was originally created.

For example, session 318 may have been originally created on computer system 364. Computer system 364 is a computer system like computer system 304 that controls access to resource 306. Computer system 304 and computer system 364 are members of a cluster of computers. In such an illustrative example, request 312 was received by computer system 364 instead of computer system 304, and session 318 was originally created on computer system 364 instead of computer system 304. However, computer system 364 became unavailable to handle subsequent request 340, for example, due to loss of connectivity. Subsequent request 340 is then received and processed by computer system 304. Reusing session identifier 332 in updated session cookie 358 generated in response to subsequent request 340 allows session identifier 332 to reference session 318 on computer system 364. For example, computer system 364 may return to normal operation and receive third request 366. Computer system 364 may still have cached information 348 containing session identifier 332. If computer system 364 still has cached information 348 containing session identifier 332, computer system 304 does not need to reauthenticate with computer system 364.

In illustrative embodiments in which updated session cookie 358 contains updated session identifier 368, computer system 304 also generates updated migration cookie 352 before returning resource 306 to computer system 302. Components of updated migration cookie 352 may be added to migration cookie 326 or updated migration cookie 352 may replace migration cookie 326. Updated migration cookie 352 is a cookie formatted like migration cookie 326. However, updated migration cookie 352 contains an updated session identifier 356. Updated session identifier 356 has the same value as updated session identifier 368. Updated migration cookie 352 may be encrypted and/or digitally signed by computer system 304 using an encryption key. The encryption key may be key 330 or another encryption key. In illustrative embodiments in which session identifier 332 is reused in updated session cookie 358, updated migration cookie 352 is not generated.

The illustration of computer system 302 and computer system 304 in session management environment 300 is not meant to imply physical or architectural limitations to the manner in which different features may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, additional computer systems may replace computer system 304 prior to receiving subsequent request 340. In such illustrative embodiments, the additional computer systems may not contain cached information 348. Therefore, the additional computer systems would request migration cookie 326 from computer system 302 to recreate session 318.

Additionally, session cookie 324 and migration cookie 326 may be combined into session cookie 324. In such illustrative embodiments, session cookie 324 is encrypted and/or signed using a certificate to prevent modification of session cookie 324 by computer system 302. In some illustrative embodiments in which session cookie 324 and migration cookie 326 are combined into session cookie 324, session cookie 324 is sent twice by computer system 302 when redirected to authentication script 350. Alternatively, session cookie 324 may be sent in one data transmission and migration cookie 326 may be sent in another data transmission. Such a data transmission may be requested by computer 302.

Turning now to FIG. 4, an illustration of a cookie is depicted in accordance with an illustrative embodiment. Cookie 400, represented as table 402, is an example implementation of session cookie 324 in FIG. 3. In this illustrative embodiment, cookie 400 is configured with metadata 404. Metadata 404 designates domain 406. Domain 406 identifies a number of addresses at which servers may request cookie 400. In this example, domain 406 is IBM.com. Metadata 404 may be set by a server that transmits data to generate cookie 400, such as computer system 304 in FIG. 3.

Session ID 408 designates an identifier for the session described by cookie 400. Session ID 408 is an example implementation of session identifier 332. Session ID 408 is a random number in these examples. However, session ID 408 may also be generated based on a number of parameters or selected from a list.

Creation time 410 indicates the time at which cookie 400 was created. Creation time 410 is used by a server that receives cookie 400 to determine the length of the session represented by cookie 400. Cookie 400 is transmitted to a server each time the resource is requested in domain 406. Last used time 412 indicates the most recent time that cookie 400 was updated. Last used time 412 is updated by the server that receives cookie 400 when the session associated with cookie 400 is confirmed as valid by the server. The session associated with cookie 400 is confirmed as valid by the server if session ID 408 is known to the server to be a valid session, and policy identifier 414 does not identify a rule that is not met by cookie 400. Policy identifier 414 identifies a number of rules for the use of cookie 400. In this illustrative embodiment, policy identifier 414 indicates that the session associated with cookie 400 expires after fifteen minutes of idle time. Fifteen minutes of idle time may be determined by a server receiving cookie 400 using last used time 412 and the time at which cookie 400 is received by the server. The session associated with cookie 400 is also confirmed as valid by the server if session ID 408 is not known to the server to be a valid session, but an additional cookie, such as cookie 500 in FIG. 5, and also contains session ID 408 and an authenticated user identity that is permitted to access the requested resource.

Figure 5:
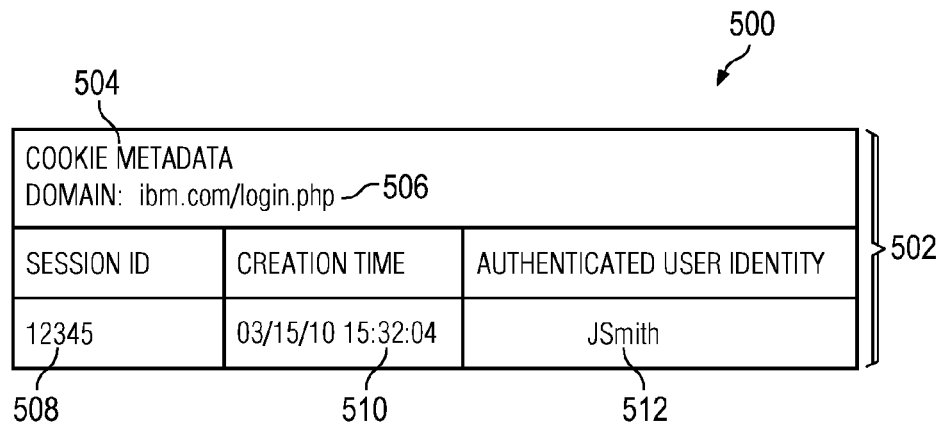
FIG. 5 is an illustration of an additional cookie depicted in accordance with an illustrative embodiment.

Turning now to FIG. 5, an illustration of an additional cookie is depicted in accordance with an illustrative embodiment. Cookie 500, represented in table 502, is an example implementation of migration cookie 326 in FIG. 3. Cookie 500 contains metadata 504. Metadata 504 is data that describes cookie 500. Metadata 504 contains domain 506. Domain 506 contains the address to which the client containing cookie 500 may send cookie 500. In this illustrative example, domain 506 is ibm.com/login.php. Domain 506 is restricted to login.php because cookie 500 may only be sent to an authentication script, such as authentication script 350 in FIG. 3. Cookie 500 is used to recreate a session on a server that does not contain cached information, such as cached information 348.

Cookie 500 contains session ID 508. Session ID 508 corresponds to session ID 408 in FIG. 4. Session ID 508 identifies a session on the server that generated the data contained in cookie 500. Creation time 510 is the time at which cookie 500 was generated. Creation time 510 corresponds to creation time 410. Authenticated user identity 512 is also contained in cookie 500. Authenticated user identity 512 identifies a user or an account on the server that generated the data contained in cookie 500. In this illustrative example, authenticated user identity 512 is JSmith. JSmith is the user name of the user with an account on the server at ibm.com. The server receiving cookie 500 uses authenticated user identity 512 to recreate the session with session ID 508 that has a number of privileges associated with the user account JSmith.

Figure 6:
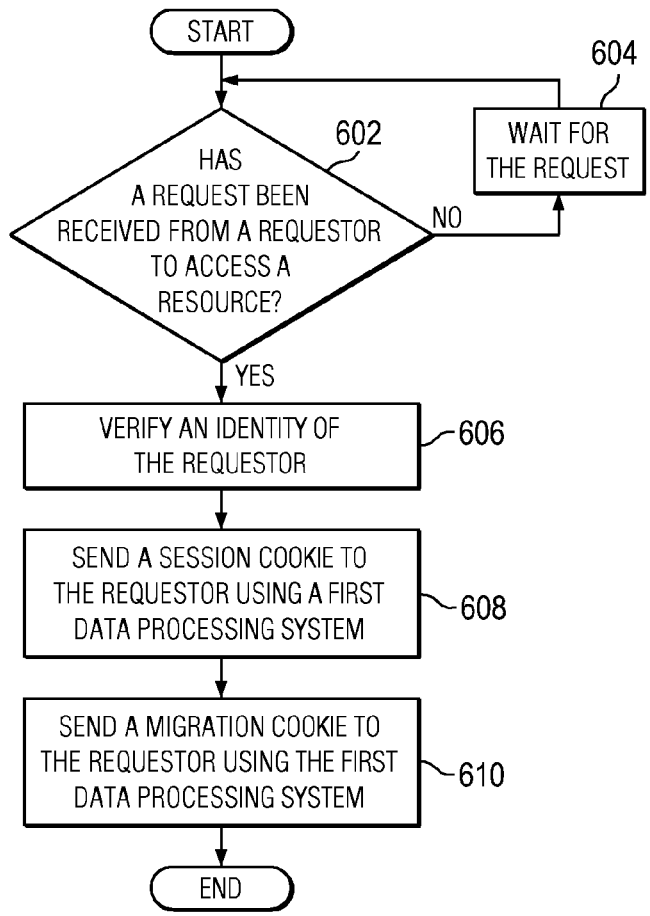
FIG. 6 is a flowchart of a process for managing secure sessions depicted in accordance with an illustrative embodiment.

Turning now to FIG. 6, a flowchart of a process for managing secure sessions is depicted in accordance with an illustrative embodiment. The process may be implemented by computer system 304 in session management environment 300 in FIG. 3.

The process begins by determining whether a request has been received from a requestor to access a resource (operation 602). If the process determines that a request has not been received by a requestor to access the resource, the process waits for the request (operation 604), and returns to operation 602. If the process determines that a request has been received by a requestor to access the resource at operation 602, the process verifies an identity of the requestor (operation 606). The identity of the requestor comprises authentication information used to identify a number of privileges to the resource for the requestor.

The process then sends a session cookie to the requestor using a first data processing system (operation 608). The process then sends a migration cookie to the requestor using the first data processing system (operation 610). In some illustrative embodiments, the information in the session cookie and the migration cookie are combined in a single cookie. The session cookie identifies a number of privileges for a session. The session cookie and the migration cookie are also used to recreate the session in the event that the server does not have a record of the session. The process terminates thereafter.

Figure 7:
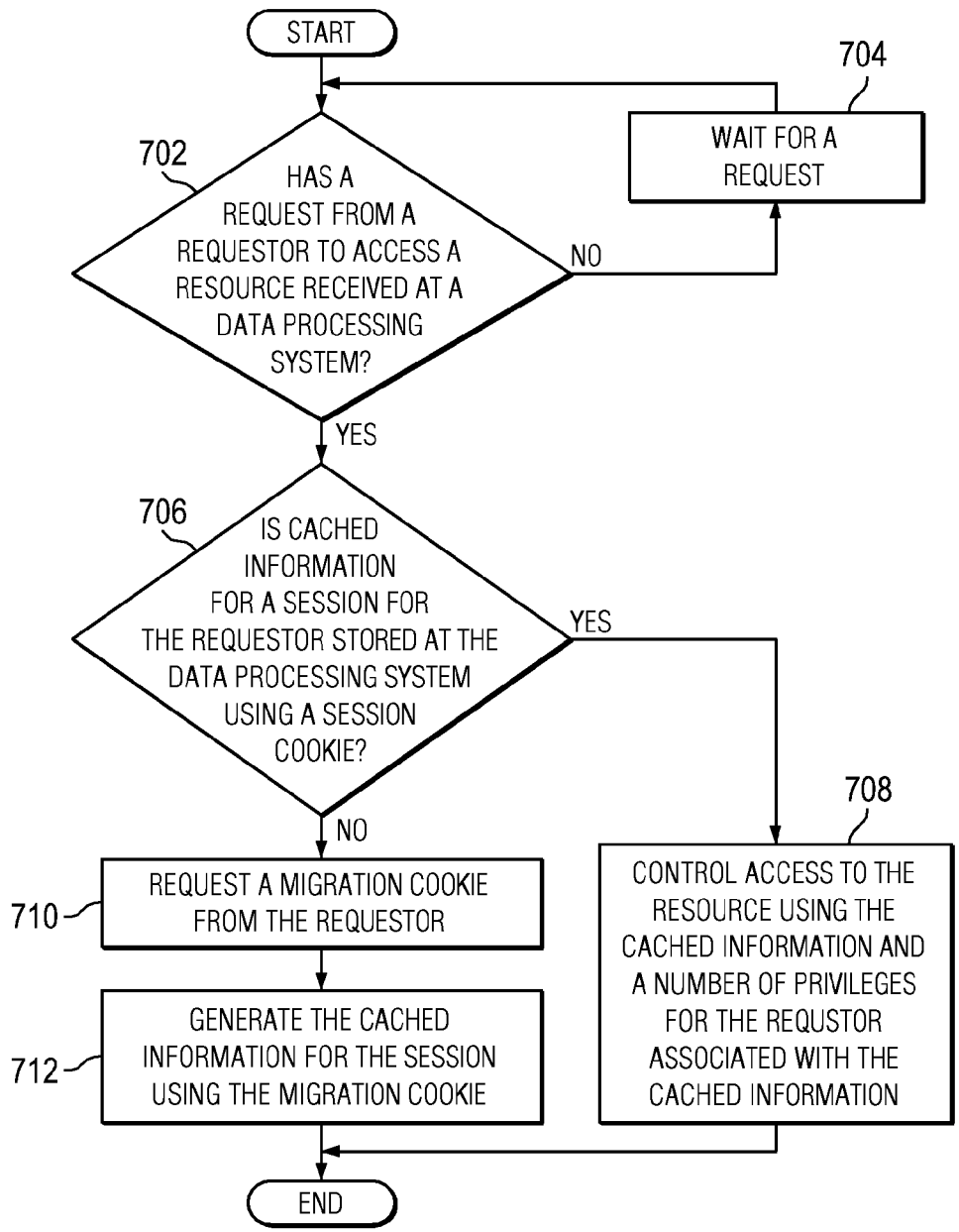
FIG. 7 is a flowchart of a process for restoring secure sessions depicted in accordance with an illustrative embodiment.

Looking at FIG. 7, a process for recreating a secure session is depicted in accordance with an illustrative embodiment. The process may be performed by computer system 304 in session management environment 300 in FIG. 3.

The process begins by determining whether a request from a requestor to access a resource has been received at a data processing system (operation 702). If the process determines that a request was not received at operation 702, the process waits for a request (operation 704) and returns to operation 702. If the process determines that the request was received at operation 702, the process determines whether cached information for a session for the requestor is stored at the data processing system using a session cookie (operation 706). The session cookie is transmitted with the request in these examples. Of course, the session cookie may also be requested from the requestor by the data processing system. The session cookie may contain a session identifier, a creation time for the session, a last used time for the session, and a policy identifier. The session cookie may be encrypted and/or digitally signed. The session identifier may be a number that uniquely identifies the session in a number of sessions managed by the data processing system. The policy identifier is a number of rules for the data processing system to use in processing the session cookie. For example, the policy identifier may contain a rule that the session expires after 15 minutes from the last used time.

If the process determines that the cached information for the session is stored at the data processing system at operation 706, the process controls access to the resource using the cached information and a number of privileges for the requestor associated with the cached information (operation 708). Controlling access means granting or denying access to the resource in accordance with the number of privileges. The number of privileges are permissions configured for the user or computer system requesting access to the resource.

If the process determines that the cached information for the session is not stored at the data processing system at operation 706, the process requests a migration cookie from the requestor (operation 710). The migration cookie contains a session identifier and information. The information in the migration cookie is used when the cached information for the session is unavailable and a subsequent request for access to the resource is made.

The process then generates the cached information for the session using the migration cookie (operation 712). The process may generate the cached information for the session by storing the information from the migration cookie as the cached information at the data processing system. The process terminates thereafter.

Figure 8:
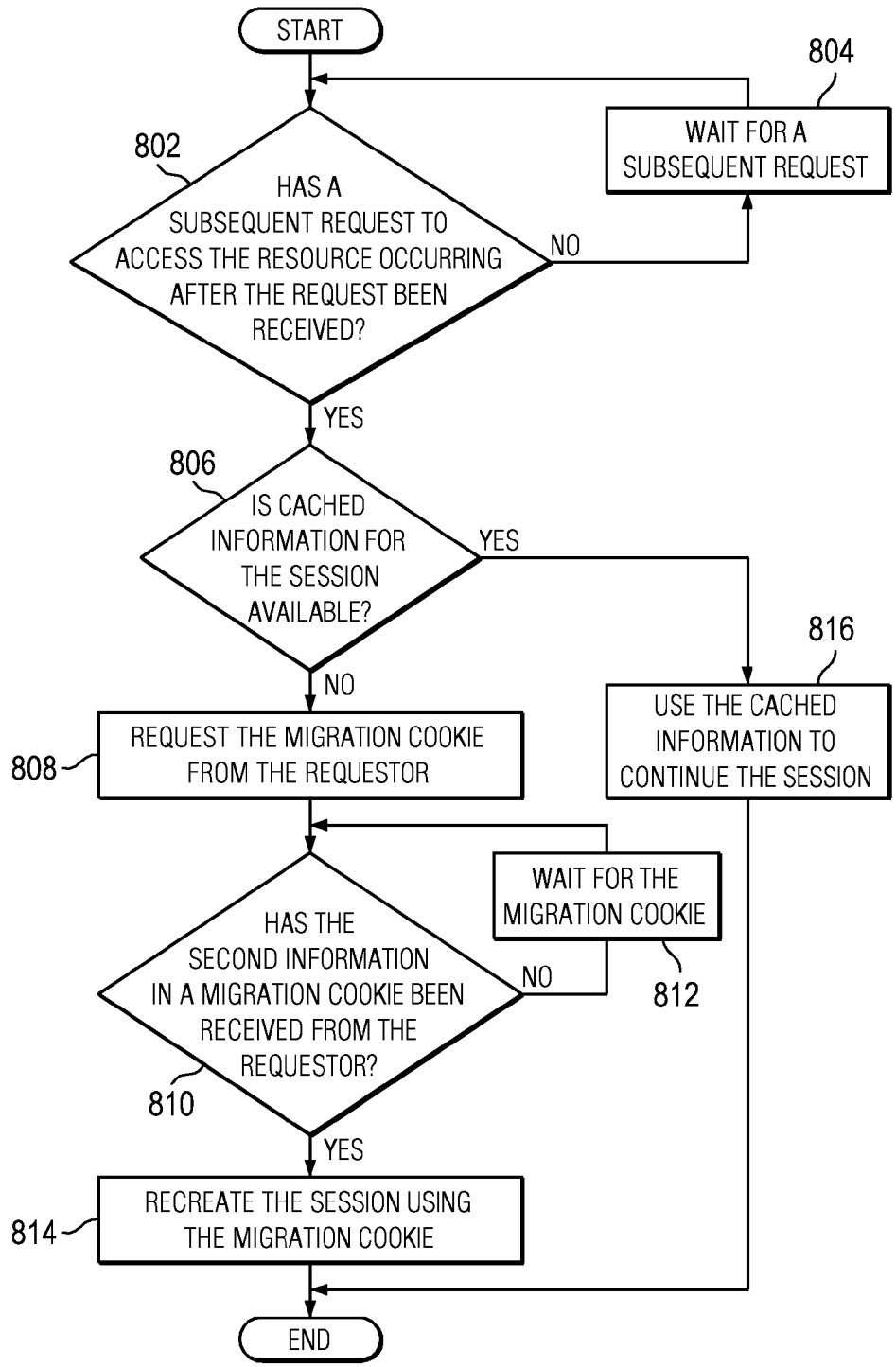
FIG. 8 is an additional process for managing secure sessions depicted in accordance with an illustrative embodiment.

With specificity to FIG. 8, an additional process for managing secure sessions is depicted in accordance with an illustrative embodiment. The process may be implemented by computer system 304 in session management environment 300 in FIG. 3. The process may be performed after operation 610 in FIG. 6.

The process begins by determining whether a subsequent request to access the resource occurring after the request has been received (operation 802). If the process determines that a subsequent request has not been received, the process waits for a subsequent request (operation 804). The process then returns to operation 802. If the process determines that a subsequent request to access the resource occurring after the request has been received, the process determines whether cached information for the session is available (operation 806). If the process determines that cached information for the session is not available, the process requests the migration cookie from the requestor (operation 808). The process then determines whether a migration cookie in a migration cookie has been received from the requestor (operation 810). If the process determines that the migration cookie in the migration cookie has not been received from the requestor, the process waits for the migration cookie (operation 812) and then returns to operation 810.

If the process determines that the migration cookie has been received from the requestor at operation 810, the process recreates the session using the migration cookie (operation 814). In some illustrative embodiments, the process compares the data in the cookie with policies or rules for the session. The policies or rules may be stored in the session cookie or the migration cookie. For example, a policy may dictate that a session for the particular user may not last longer than fifteen minutes. In such an example, the process does not perform operation 814 if more than fifteen minutes has elapsed since the session cookie and/or the migration cookie was generated. If the process determines that cached information for the session is available at operation 806, the process uses the cached information to continue the session at operation 816. The process may also send an updated session cookie back to the client for storage. The updated session cookie may update the session cookie with a last used time, such as last used time 412 in FIG. 4 or other suitable information. The process terminates thereafter.

Figure 9A:
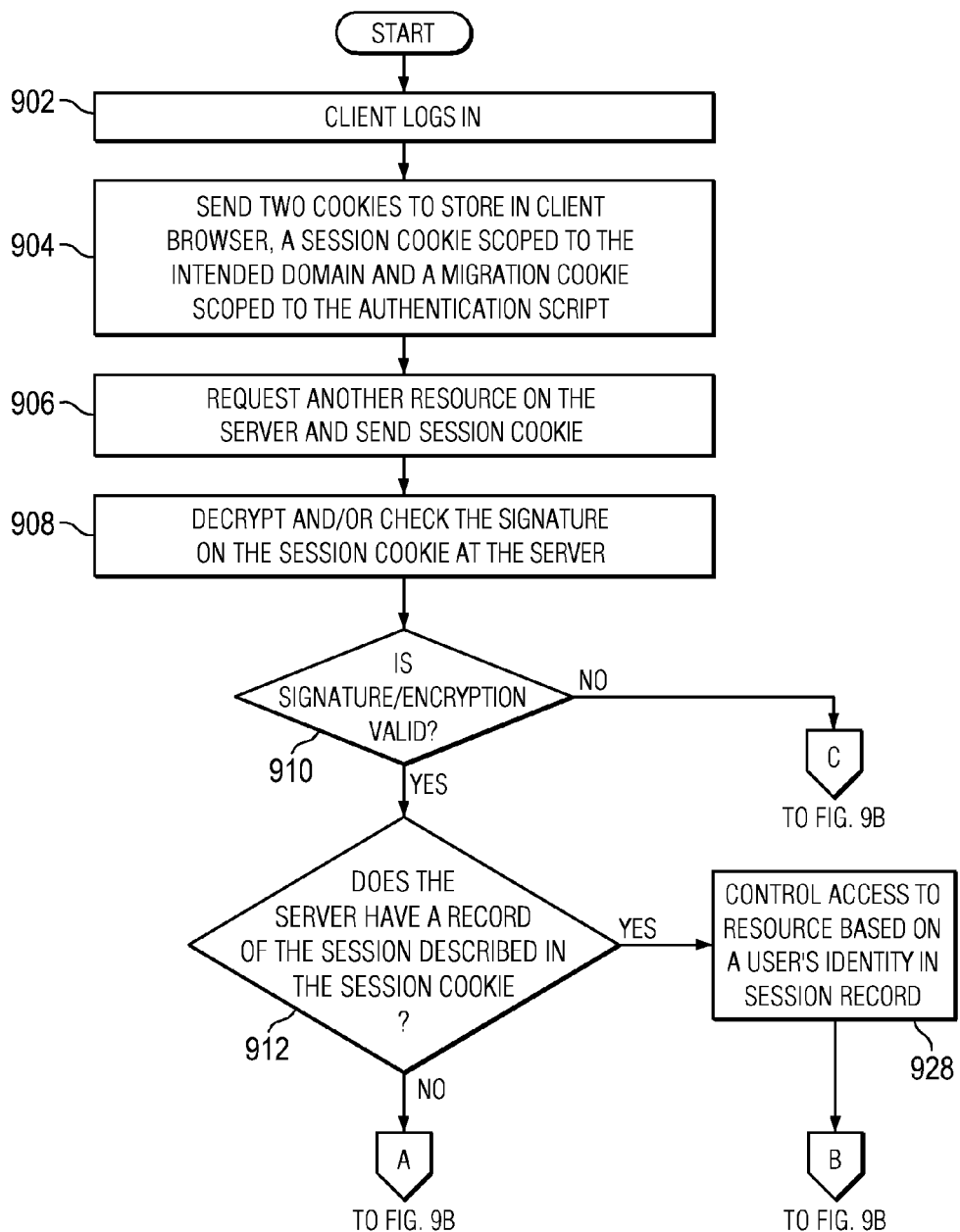
FIGS. 9A and 9B are a third process for managing secure sessions depicted in accordance with an illustrative embodiment.
Figure 9B:
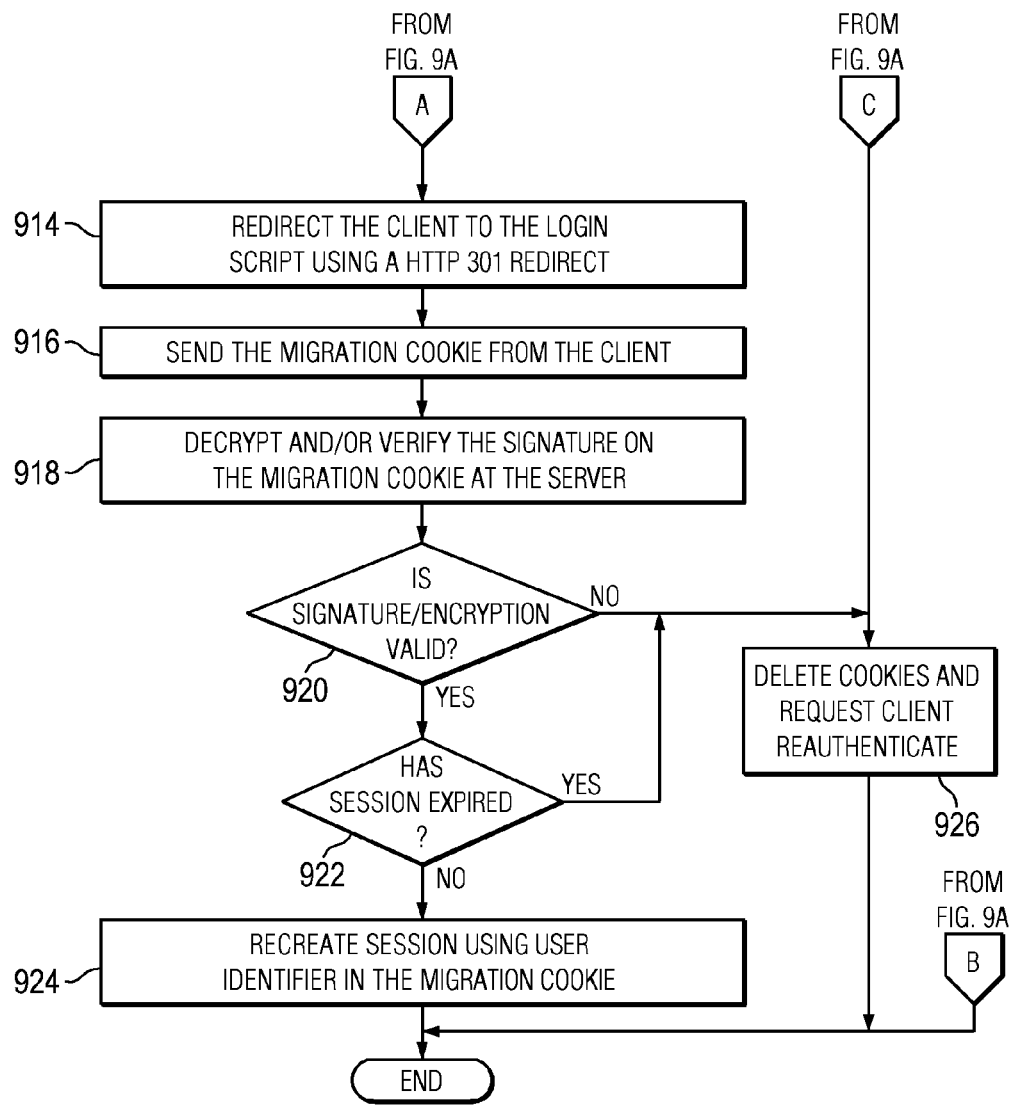

Turning now to FIGS. 9A and 9B, a third process for managing secure sessions is depicted in accordance with an illustrative embodiment. The process may be implemented by computer system 304 in session management environment 300 in FIG. 3.

The process begins by the client logging in at operation 902. The process also requests a resource on the server after logging in. The client may log in using any combination of a user name, a password, a biometric identifier, an access card, a certificate, or another suitable authentication method. The process then sends two cookies to store in the client browser, a session cookie scoped to the intended domain and a migration cookie scoped to the authentication script (operation 904). The process then requests another resource on the server and sends the session cookie (operation 906). Alternatively, the process may request the same resource on the server as in operation 902. The process then decrypts and/or checks the signature on the session cookie at the server (operation 908). The process then determines whether the signature and/or encryption on the session cookie is valid (operation 910). If the process determines that the signature and/or encryption are invalid, the process proceeds to operation 926. If the process determines that the signature and/or encryption are valid at operation 910, the process determines whether the server has a record of the session described in the session cookie (operation 912). If the process does not have a record of the session described in the session cookie, the process redirects the client to the login script using an HTTP 301 redirect (operation 914). The process then sends the migration cookie from the client (operation 916).

The process then decrypts and/or verifies the signature on the migration cookie at the server (operation 918). The process then determines whether the signature and/or encryption is valid (operation 920). The validity of the signature and/or encryption of the migration cookie may be verified using a predetermined decryption key and/or a certificate. If the process determines that the signature and/or encryption is valid, the process determines whether the session has expired (operation 922). The session is determined to have expired if a last access time in the session cookie and/or a created time in the session cookie exceeds predetermined limits contained in a policy identifier such as policy identifier 414. If the process determines that the session has not expired, the process recreates the session using user identifier in the migration cookie (operation 924). The user identifier in the migration cookie is used to retrieve the privileges associated with the user account for the identifier on the server. The process terminates thereafter.

If the process determines at operation 922 that the session has expired, the process deletes the session cookie and the migration cookie and requests that the client reauthenticate (operation 926). The process terminates thereafter. If the process determines that the server has a record of the session described in the session cookie at operation 912, the process controls access to the resource based on the user's identity in session record (operation 928). The process terminates thereafter.

The flowchart and block diagrams in the different depicted embodiments illustrate the architecture, functionality, and operation of some possible implementations of apparatus and methods in different illustrative embodiments. In this regard, each block in the flowchart or block diagrams may represent a module, segment, function, and/or a portion of an operation or step.

In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

For example, the process may use a JavaScript redirect at operation 914 instead of an HTTP 301 redirect. Additionally, the process may send only one cookie to store in the client browser at operation 904. Additionally, the process may wait for a period of time at operation 812 before timing out and terminating the process.

Thus, the different illustrative embodiments allow a session to be recreated on a server in the event the server is moved, experiences downtime, or is replaced with another server. Additionally, the session may be created on another server in a load balancing cluster. The authenticated user identity associated with the privileges granted to the user for the resource is stored in encrypted and/or signed cookie stored in the client browser. The cookie allows the session to be recreated without allowing the cookie to be tampered with or modified. The different illustrative embodiments also allow a newly created or recreated session to enforce policy or rule restrictions without storing a record of the session in the location accessible to both the old and the new server. Storing the session information in the client browser reduces the resources used by the server to control access to the resources.

Thus, the different illustrative embodiments provide a method, a computer program product, and an apparatus for restoring secure sessions. A determination is made whether cached information for a session for the requestor is stored at the data processing system using a session cookie responsive to receiving a request at a data processing system from a requestor to access a resource. Access to the resource is controlled using the cached information and a number of privileges for the requestor associated with the cached information responsive to a determination that the cached information for the session is stored at the data processing system. A migration cookie is requested from the requestor responsive to an absence of a determination that the cached information for the session is stored at the data processing system. The cached information is generated for the session using the migration cookie.

A first component is considered to be associated with a second component by being secured to the second component, bonded to the second component, fastened to the second component, and/or connected to the second component in some other suitable manner. The first component also may be connected to the second component through using a third component. The first component is also considered to be associated with the second component by being formed as part of and/or an extension of the second component.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowcharts and combinations of blocks in the block diagrams and/or flowcharts can be implemented by special purpose hardware-based systems that perform the specified functions or acts or combinations of special purpose hardware and computer instructions.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/ or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for restoring secure sessions, the method comprising:

responsive to receiving a request at a data processing system from a requestor to access a resource, determining whether cached information for a session for the requestor is stored at the data processing system using a session cookie;

responsive to a determination that the cached information for the session is stored at the data processing system, controlling access to the resource using the cached information and a number of privileges for the requestor associated with the cached information;

responsive to an absence of a determination that the cached information for the session is stored at the data processing system, requesting a migration cookie from the requestor;

generating the cached information for the session using the migration cookie; and responsive to a determination that the cached information for the session is stored at the data processing system, sending a cookie to the requestor, wherein the cookie forms the migration cookie at the requestor.

2. The method of claim 1, further comprising:

verifying a digital signature for the session cookie and the migration cookie;

decrypting the session cookie and the migration cookie using a key; and restoring the session using the cached information.

3. The method of claim 2, wherein the session cookie comprises a session identifier for the session, a creation time that indicates a time the session cookie was created, a last used time that indicates a time the session cookie was updated, and a policy identifier that identifies a number of rules for use of the session cookie.

4. The method of claim 3, wherein the step of determining whether the cached information for the session is stored at the data processing system using the session cookie further comprises:

determining whether the session identifier in the session cookie is stored at the data processing system;

responsive to a determination that the session identifier in the session cookie is stored at the data processing system, determining whether the session is expired; and responsive to an absence of a determination that the session is expired, determining that the cached information for the session is stored at the data processing system.

5. The method of claim 3, wherein the migration cookie comprises a session identifier, and information for restoring the session when cached information for the session is unavailable and a subsequent request for access to the resource is made.

6. The method of claim 5, wherein the step of generating the cached information for the session using the migration cookie further comprises:
storing the information from the migration cookie as the cached information at the data processing system.

7. The method of claim 1, further comprising:
responsive to an absence of a determination that the cached information for the session is stored at the data processing system using the session cookie, directing the requestor to an authentication script, wherein the authentication script requests that the requestor provide the migration cookie that comprises information for restoring the session when cached information for the session is unavailable and a subsequent request for access to the resource is made.

8. A computer program product comprising:
a computer readable storage device;
program code, stored on the computer readable storage device, for determining whether cached information for a session for the requestor is stored at the data processing system using a session cookie responsive to receiving a request at a data processing system from a requestor to access a resource;
program code, stored on the computer readable storage device, for controlling access to the resource using the cached information and a number of privileges for the requestor associated with the cached information responsive to a determination that the cached information for the session is stored at the data processing system;
program code, stored on the computer readable storage device, for requesting a migration cookie from the requestor responsive to an absence of a determination that the cached information for the session is stored at the data processing system;
program code, stored on the computer readable storage device, for generating the cached information for the session using the migration cookie to restore the session; and
program code, stored on the computer readable storage device, for sending a cookie to the requestor responsive to a determination that the cached information for the session is stored at the data processing system, wherein the cookie forms the migration cookie at the requestor.

9. The computer program product of claim 8, further comprising:
program code, stored on the computer readable storage device, for verifying a digital signature for the session cookie and the migration cookie;
program code, stored on the computer readable storage device, for decrypting the session cookie and the migration cookie using a key.

10. The computer program product of claim 9, wherein the session cookie comprises a session identifier for the session, a creation time that indicated a time the session cookie was created, a last used time that indicated a time the session cookie was last updated, and a policy identifier that identifies a number of rules for use of the session cookie.

11. The computer program product of claim 10, wherein the program code, stored on the computer readable storage device, for determining whether the cached information for the session is stored at the data processing system using the session cookie further comprises:
program code, stored on the computer readable storage device, for determining whether the session identifier in the session cookie is stored at the data processing system;
program code, stored on the computer readable storage device, for determining whether the session is expired responsive to a determination that the session identifier in the session cookie is stored at the data processing system; and
program code, stored on the computer readable storage device, for determining that the cached information for the session is stored at the data processing system responsive to an absence of a determination that the session is expired.

12. The computer program product of claim 10, wherein the migration cookie comprises a session identifier, and information for restoring the session when cached information for the session is unavailable and a subsequent for access to the resource is made.

13. The computer program product of claim 12, wherein the program code, stored on the computer readable storage medium, for generating the cached information for the session using the migration cookie further comprises:
program code, stored on the computer readable storage device, for storing the information from the migration cookie as the cached information at the data processing system.

14. The computer program product of claim 8 further comprising:
program code, stored on the computer readable storage device, for directing the requestor to an authentication script, wherein the authentication script requests that the requestor provide the migration cookie that comprises information for restoring the session when cached information for the session is unavailable and a subsequent for access to the resource is made responsive to an absence of a determination that the cached information for the session is stored at the data processing system using the session cookie.

15. The computer program product of claim 8, wherein the computer readable storage device is in a data processing system, and the program code is downloaded over a network from a remote data processing system to the computer readable storage medium in the data processing system.

16. The computer program product of claim 12, wherein the computer readable storage medium is a first computer readable storage device, wherein the first computer readable storage device is in a server data processing system, and wherein the program code is downloaded over a network to a remote data processing system for use in a second computer readable storage device in the remote data processing system.

17. An apparatus comprising:
a bus system;
a storage device connected to the bus system, wherein the storage device includes program code; and
a processor unit connected to the bus system, wherein the processing unit executes the program code to determine whether cached information for a session for the requestor is stored at the data processing system using a session cookie responsive to receiving a request at a data processing system from a requestor to access a resource; control access to the resource using the cached information and a number of privileges for the requestor associated with the cached information responsive to a determination that the cached information for the session is stored at the data processing system; request a migration cookie from the requestor responsive to an absence of a determination that the cached information for the session is stored at the data processing system; generate the cached information for the session using the migration cookie to restore the session; and send a cookie to the requestor responsive to a determination that the cached information for the session is stored at the data processing system, wherein the cookie forms the migration cookie at the requestor.

18. The apparatus of claim 17, wherein the processor unit further executes the program code to verify a digital signature for the session cookie and the migration cookie; and decrypt the session cookie and the migration cookie using a key.

19. The apparatus of claim 18, wherein the session cookie comprises a session identifier for the session, a creation time that indicates a time the session cookie was created, a last used time that indictates a time the session cookie was last updated, and a policy identifier that identifies a number of rules for use of the session cookie.

20. The apparatus of claim 18, wherein the migration cookie comprises a session identifier, and information for restoring the session when cached information for the session unavailable and a subsequent request for access to the resource is made.

* * * * *